(12) United States Patent
Mir et al.

(10) Patent No.: US 7,575,088 B2
(45) Date of Patent: Aug. 18, 2009

(54) POWERTRAIN MOUNTING SYSTEM

(75) Inventors: Hamid Mir, Rochester Hills, MI (US); Adrian VanCampenhout, Plymouth, MI (US); Christopher A Wolfe, Detroit, MI (US); John D Richardson, Sumpter Township, MI (US); John Boughton, White Lake, MI (US); Ted Thelen, Ann Arbor, MI (US); Larry W Bell, Canton, MI (US); Brian J Rahn, Saint Clair Shores, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 382 days.

(21) Appl. No.: 11/428,152

(22) Filed: Jun. 30, 2006

(65) Prior Publication Data

US 2007/0000713 A1  Jan. 4, 2007

Related U.S. Application Data

(60) Provisional application No. 60/696,290, filed on Jul. 1, 2005.

(51) Int. Cl.
*B60K 1/00* (2006.01)
*B60K 3/00* (2006.01)

(52) U.S. Cl. .................. 180/300; 180/297; 180/312

(58) Field of Classification Search .............. 180/300, 180/299, 297, 312, 377; 248/638, 636, 543, 248/544; 267/140.1, 140.3, 141.3
See application file for complete search history.

(56) References Cited

U.S. PATENT DOCUMENTS

| | | | | |
|---|---|---|---|---|
| 3,698,703 A | * | 10/1972 | Hipsher | 267/219 |
| 3,702,178 A | * | 11/1972 | Schulz | 267/140.3 |
| 4,142,701 A | * | 3/1979 | Fujii et al. | 248/544 |
| 5,035,296 A | * | 7/1991 | Sjostrand | 180/297 |
| 5,074,374 A | * | 12/1991 | Ohtake et al. | 180/312 |
| 5,174,541 A | * | 12/1992 | Hutter et al. | 248/636 |
| 5,718,407 A | * | 2/1998 | Lee | 248/634 |
| 5,791,627 A | * | 8/1998 | Fisch et al. | 248/543 |
| 6,223,850 B1 | * | 5/2001 | Rajca et al. | 180/377 |
| 6,374,939 B1 | * | 4/2002 | Hohnstadt et al. | 180/299 |
| 6,408,974 B1 | * | 6/2002 | Viduya et al. | 180/312 |
| 6,540,042 B2 | * | 4/2003 | Hamaekers et al. | 180/300 |
| 6,572,088 B2 | * | 6/2003 | Tadano et al. | 267/141.3 |
| 6,988,579 B2 | * | 1/2006 | Miyahara | 180/299 |

* cited by examiner

*Primary Examiner*—Hau V Phan
(74) *Attorney, Agent, or Firm*—Ralph E. Smith

(57) ABSTRACT

A powertrain mounting system includes a pair of engine and transmission mount assemblies. The engine mount assemblies include an isolator assembly having an elastomeric bushing with an encapsulated mounting member, an integral snubber, and a bracket assembly having a one piece can arranged to house the bushing and having an interlock arranged to engage the bushing. The bushing is press-fit into the can and arranged to isolate the mounting member from the can thereby dampening powertrain vibration and controlling powertrain movement, and the snubber is arranged to limit movement of the bushing relative to the can. The transmission mount assembly includes a support member, a pair of isolators positioned relative to each other, and a pair of mounting brackets positioned on the isolators; wherein the isolators are arranged to maintain the mounting brackets in spaced relation to the support member thereby dampening powertrain vibration and controlling powertrain movement.

20 Claims, 6 Drawing Sheets

POWERTRAIN MOUNTING SYSTEM

CROSS REFERENCE TO RELATED APPLICATION(S)

This application claims benefit of U.S. Provisional Application Ser. No. 60/696,290 filed Jul. 1, 2005.

FIELD OF INVENTION

The present invention relates generally to a powertrain mounting system and, more particularly, to an engine and transmission mounting system for a vehicle.

BACKGROUND OF INVENTION

Various vehicle engine and transmission mounting arrangements have been employed throughout the years that are intended to hold such powertrain components in place in the vehicle while also providing vibration isolation between the components and the vehicle body. Often such arrangements utilize multi-piece brackets and multi-piece, symmetrical pre-loaded engine bushings (PLEB) to mount and isolate the engine from the vehicle body. These multi-piece brackets typically require several welding operations to form the finished bracket, resulting in added manufacturing expense and a potential for the welded areas to break down over time. In addition, transmission mounting arrangements often utilize one mount typically located under a central portion of the transmission. While this transmission mounting arrangement has been used over the years, one potential drawback of this arrangement is less control over cross-car transmission vibration. As a result, there is a need for a powertrain mounting arrangement with reduced manufacturing complexity and improved noise, vibration and harshness (NVH) performance.

SUMMARY OF INVENTION

Accordingly, an improved powertrain mounting system for an engine and transmission is provided. In accordance with one aspect of the present invention, the mounting system includes a pair of engine mount assemblies and a transmission mount assembly. Each engine mount assembly includes an engine mount isolator assembly and an engine mount bracket assembly. The engine mount isolator assembly includes an elastomeric bushing with an encapsulated mounting member and an integral snubber. The engine mount bracket assembly includes a one piece can arranged to house the isolator assembly, and a flange for attaching the engine mount bracket assembly to a vehicle frame component, the one piece can also includes an interlock arranged to engage the elastomeric bushing. The engine mount isolator assembly is press-fit into the can and the interlock is arranged to retain the engine mount isolator assembly relative to the can, wherein the integral snubber is arranged to limit movement of the mounting member and bushing to a predetermined amount relative to the can, and wherein the bushing is arranged to isolate the mounting member from the can thereby dampening powertrain vibration and controlling powertrain movement relative to the vehicle frame component.

The transmission mount assembly includes a support member arranged to be attached to a vehicle frame component, a pair of elastomeric transmission isolators positioned relative to each other on the support member, and a pair of transmission mounting brackets arranged to be positioned on the isolators and attached to a transmission component; wherein the transmission isolators are arranged to maintain the transmission mounting brackets in spaced relation to the support member thereby dampening powertrain vibration and controlling powertrain movement relative to the vehicle.

In accordance with another aspect of the present invention, a powertrain mounting system is provided having a pair of elastomeric transmission isolators positioned relative to each other and a support member including an isolator support portion positioned on each end of a central connecting portion and angled relative to the central connecting portion at an angle of between 20 and 27 degrees, wherein the elastomeric transmission isolators are positioned relative to each other on the isolator support portions of the support member.

In accordance with yet another aspect of the present invention, a powertrain mounting system is provided having a pair of elastomeric transmission isolators positioned relative to each other and a support member including an isolator support portion positioned on each end of a central connecting portion and angled relative to the central connecting portion at an angle of between 20 and 27 degrees, wherein the elastomeric transmission isolators are positioned relative to each other and spaced apart a distance between 220 mm and 240 mm on the isolator support portions of the support member.

In accordance with yet another aspect of the present invention, a powertrain mounting system is provided having pair of transmission isolators including a first isolator having a first isolator surface opposed to a transmission and a first isolator axis projecting normal to the first isolator surface and intersecting a torque reaction axis of the transmission; and a second isolator having a second isolator surface opposed to the transmission and a second isolator axis projecting normal to the second isolator surface and intersecting the torque reaction axis of the transmission; wherein the first and second isolator axes intersect the torque reaction axis at substantially a ninety degree angle to each other.

BRIEF DESCRIPTION OF DRAWINGS

Other aspects, features, and advantages of the present invention will become more fully apparent from the following detailed description of the preferred embodiment, the appended claims, and the accompanying drawings in which:

DETAILED DESCRIPTION OF EXEMPLARY EMBODIMENTS(S)

Figure 1:
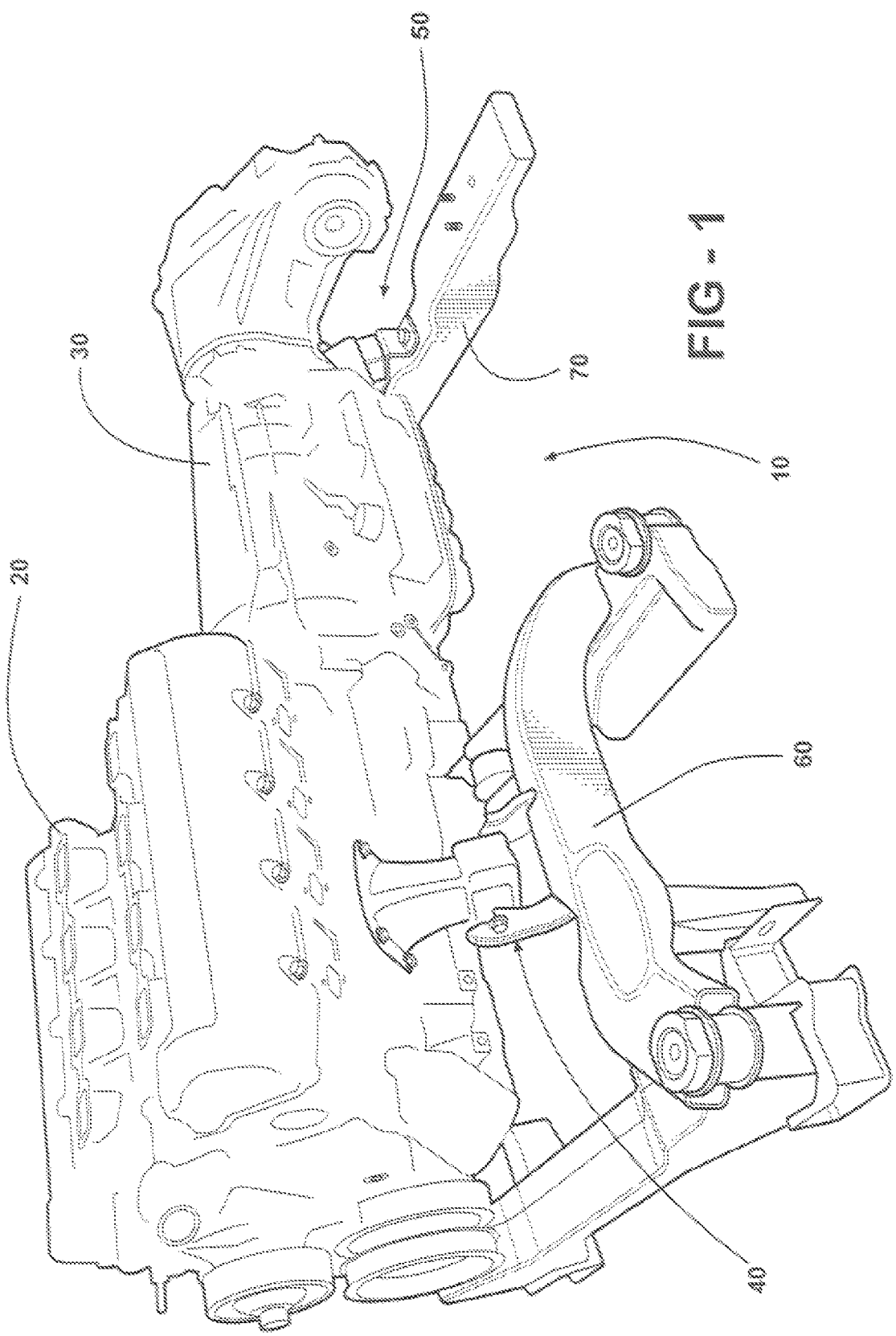
FIG. 1 illustrates a front elevated perspective view of a vehicle engine and transmission mounted to a vehicle structure using an engine mount arrangement and a transmission mount arrangement (shown at the rear of the transmission) in accordance with the present invention.

In the following description, several well-known features of a vehicle frame structure and more specifically an engine cradle and a transmission mounting cross-member are not shown or described so as not to obscure the present invention. With general reference to the various views and embodiments illustrated in FIGS. 1-6, the present invention provides a powertrain mounting system for an engine and transmission of a vehicle. With more particular reference to FIGS. 1 and 2, a powertrain mounting system 10 for an engine 20 and transmission 30 is provided. Powertrain mounting system 10 includes a pair of engine mount assemblies 40 (each identified with reference numeral 40) arranged to mount engine 20 to a vehicle frame structural component, such as engine cradle assembly 60, and a transmission mount assembly 50 arranged to likewise mount transmission 30 to a vehicle frame structural component, such as transmission mounting cross-member 70.

Figure 2:
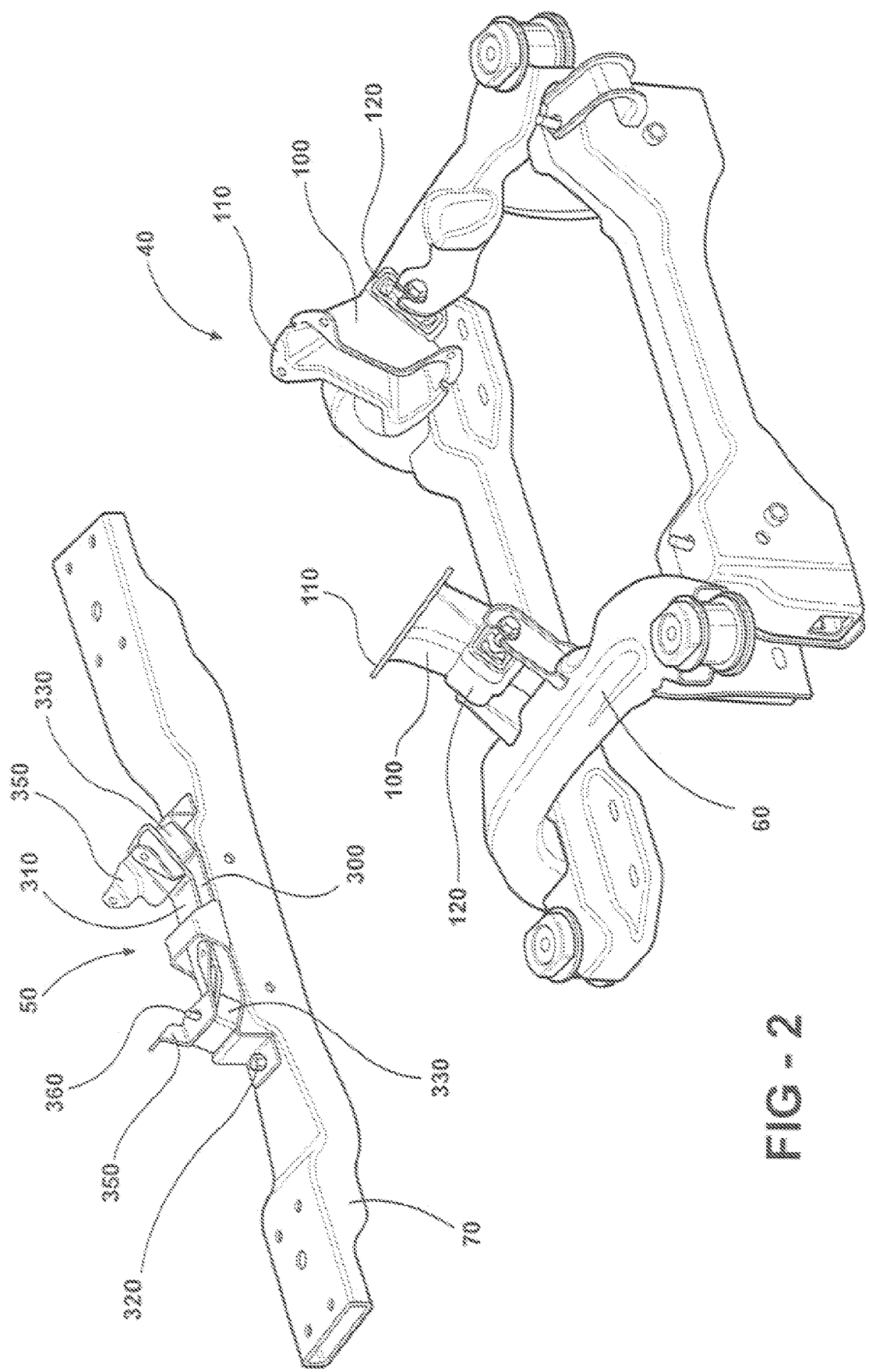
FIG. 2 illustrates a front elevated perspective view of the engine mount arrangement and transmission mount arrangement of FIG. 1 with the engine and transmission not shown in accordance with the present invention.
Figure 3:
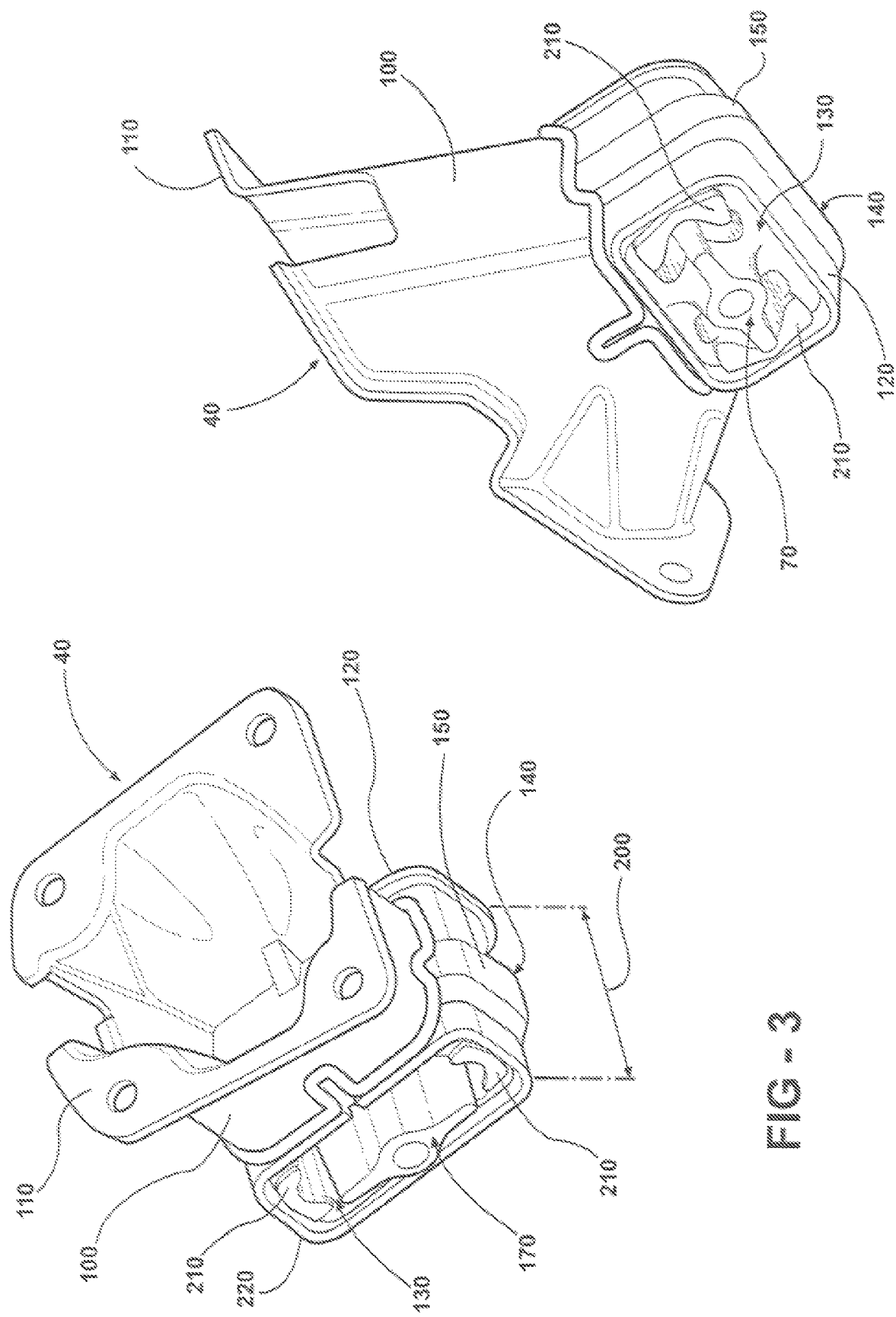
FIG. 3 illustrates a perspective view of a pair of engine mount assemblies in accordance with the present invention.

Referring now to FIGS. 1-4, engine mount assemblies 40 each include a bracket assembly 100 having a flange portion 110 for mounting bracket assembly 100 to engine 20 and a can member 120 for housing an isolator assembly 130. The can member 120 is constructed of a one-piece stamping for improved durability, as opposed to a two piece stamping assembly that is welded together and is then welded to flange portion 110. Can member 120 further includes an interlock 140 arranged to provide retention of isolator assembly 130 to can member 120. Interlock 140 includes a protrusion 150 positioned in a central portion of a width of the can member 120 and extending around a perimeter thereof as best shown in FIG. 3. Interlock 140 is arranged to engage isolator assembly 130 upon insertion into can member 120.

Figure 4:
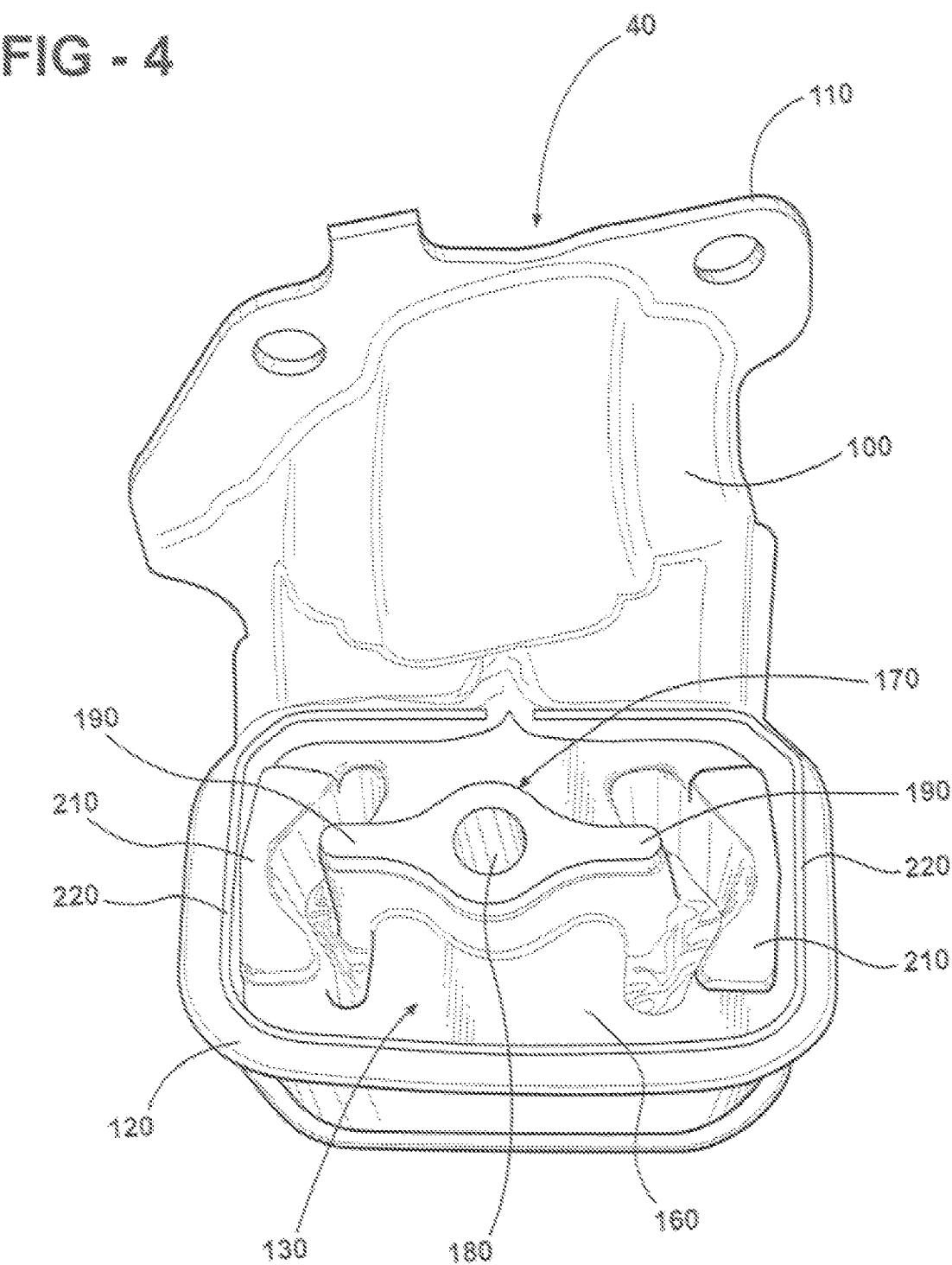
FIG. 4 illustrates a side view of one of the pair of engine mount assemblies of FIG. 3 in accordance with the present invention.

Isolator assembly 130 includes an elastomeric bushing 160 with a molded-in, encapsulated mounting member 170 as best shown in FIG. 4. Bushing 160 is designed and tuned for specific engine and vehicle applications, with a predetermined parallelogram shape, such as a rectangular shape shown in FIG. 4, for error-proofing during assembly operations. Mounting member 170 is preferably constructed from a metallic material, such as steel or aluminum, and includes a bore 180 for receiving a fastener and integral projections 190 extending parallel to the longer side of the rectangular shape of busing 160. Protrusions 190 aid in retention of mounting member 170 in bushing 160 as well as provide tuning by varying a length of the projections for specific engine/vehicle requirements.

Bushing 160 is sized in connection with can member 120 such that it will be press-fit into can member 120 resulting in a predetermined pre-load from the press-fit assembly and also has greater than 4:1 compression to shear rate ratio. More specifically, the compression to shear rate ratio is determined form a combination of a length to height ratio of the bushing prior to being press-fit, the resulting pre-load from pressing the bushing into the can and, the shape of the mounting member 170 (and specifically the protrusions).

Bushing 160 is centrally positioned in can member 120 and has a width less than a width 200 of can member 120 as best shown in FIG. 3. In addition, isolator assembly 130 further includes integral snubbers 210 that extend or protrude outward from bushing 160 toward an external edge 220 of can member 120 as best shown in FIGS. 3 and 4. Integral snubbers can vary in length, but generally do not extend beyond edge 220 of can member 120. Integral snubbers 210 are arranged to limit movement of bushing 160 beyond edge 220 by coming into contact with an engine mounting component (not shown) positioned contiguous to edge 220 of can member 120 when engine mount assembly 40 is utilized to secure engine 20 to engine cradle 60. In the exemplary embodiment, there are two snubbers 210 per each side of busing 160. However, it should be appreciated that the size and number of snubbers can be varied depending on specific engine/vehicle mounting and tuning (NVH) requirements. By integrating snubbers 210 into busing 160, the need for separate, additional bushing components designed to limit over-travel is eliminated thus reducing cost and complexity.

Figure 5:
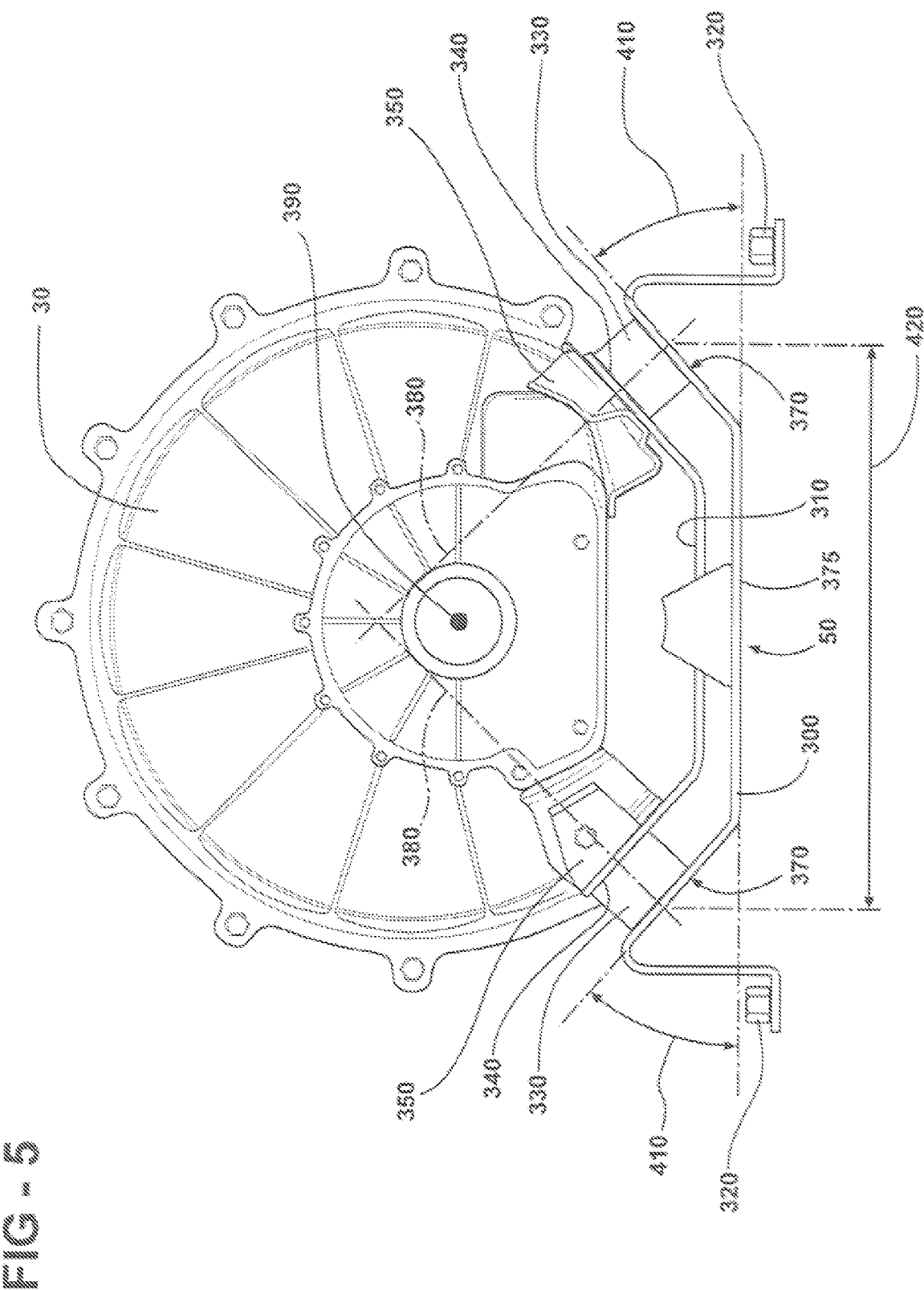
FIG. 5 illustrates a rear view of the transmission mount arrangement of FIGS. 1 and 2 in accordance with the present invention.

Turning to FIGS. 1, 2, 5 and 6 transmission mount assembly 50 of powertrain mounting system 10 includes a lower support member 300 and an upper support member 310. Lower support member 300 is arranged to be secured to transmission cross member 70 with fasteners 320 and support a pair of isolators 330 positioned relative to each other and transmission 30 as best shown in FIG. 5. Upper support member 310 is positioned on a top surface 340 of isolators 330 and is arranged to provide cross-car support for mounting assembly 50 as well as structural support for transmission mounting brackets 350. Mounting brackets 350 as well as upper support member 310 and isolators 330 are respectively secured to lower support member 300 with a fastener 360 as best shown in FIG. 2.

With particular reference to FIG. 5, isolator support areas 370 of lower support member 300 are spaced apart from each other in a cross-car direction and angled inwardly towards transmission 30. Upper support member 310 is likewise configured such that it nests on top surfaces of 340 of isolators 330 as shown in FIG. 5. By using a pair of transmission mounts spaced and angled as described above, transmission torque reaction as well as vibration and cross-car movement are better controlled versus one mount positioned under a central area of transmission 30.

It should be understood that the distance that isolators 330 are spaced apart from each other and a thickness of isolators 330 will depend on transmission and vehicle tuning and packaging requirements. Notwithstanding, it has been found that optimum NVH performance and control of transmission movement can be obtained through use of specific angular and spacing relationships of isolators 330 relative to each other and transmission 30. More specifically, as shown in FIG. 5, isolator support areas 370 are angled at an angle 410 of between 20 and 27 degrees relative to a central connecting portion 375 as well as positioned centrally under a torque reaction axis 390 of transmission 30. In addition, isolators 330 are positioned relative to each other with a spacing 420 of between 220 mm and 240 mm. Finally, it should be noted that the transmission mounting system can be offset cross-car relative to the torque reaction axis 390 of the transmission and still be effective in controlling and dampening vibration created by the transmission during engine idle and while moving forward and reverse at vehicle speed.

Figure 6:
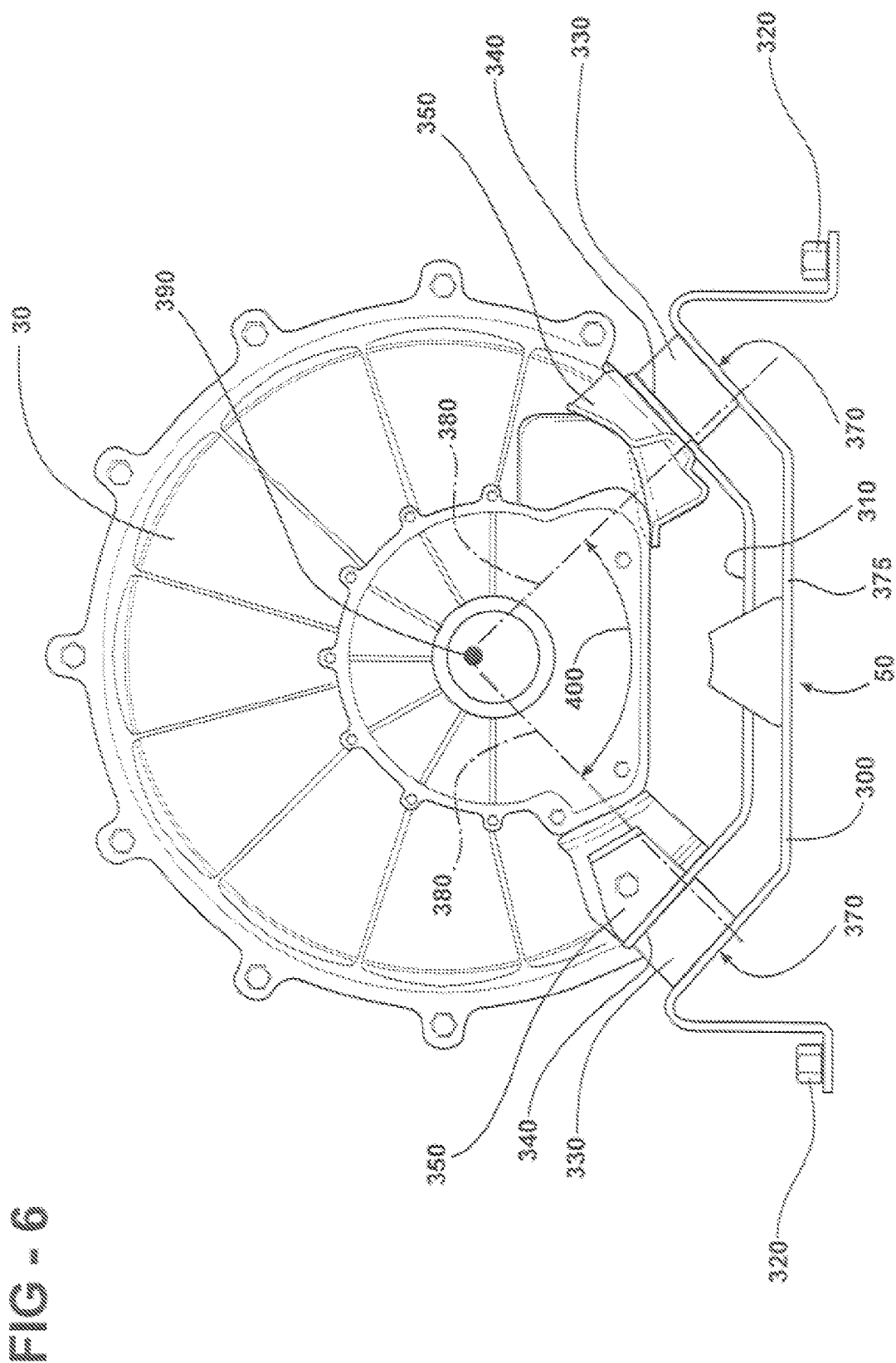
FIG. 6 illustrates a rear view of another aspect of the transmission mount arrangement of FIGS. 1 and 2 in accordance with the present invention.

In accordance with another aspect of the transmission mounting system, and referring to FIG. 6, each of the isolators 330 are spaced apart and angled towards transmission 30 such that an axis 380 projecting perpendicular to top surface 340 intersects the torque reaction axis 390 of transmission 30 as shown in FIG. 5. In addition, it has been found that improved performance can be achieved by having each axis 380 intersect torque reaction axis 390 at substantially a ninety degree angle 400 to each other.

In operation, powertrain mounting system 10 provides a focused, tunable four isolator pad mounting system for a vehicle. The mounting system provides superior NVH performance through use of the four pad isolator system where the isolators are positioned in spaced relation to each other and relative to the engine and transmission. The engine mounts utilize a one piece housing providing improved durability as well as maintenance of the predetermined pre-load through elimination of the possibility of the housing separating over time thereby lessening the press-fit and thus the pre-load. The geometry of the can housing can also be designed to be common to all engine mounts, further reducing cost and complexity. In addition, the transmission mount arrangement provides superior NVH performance and movement control through use of two isolators positioned in spaced relation to each other and with specific angular relationships as compared to an arrangement utilizing one mount positioned under a central portion of the transmission.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A powertrain mounting system for an engine and transmission, the mounting system comprising:
   a pair of engine mount assemblies, each engine mount assembly including:
      an engine mount isolator assembly having an elastomeric bushing with an encapsulated mounting member and an integral snubber; and
      an engine mount bracket assembly having a one piece can arranged to house the isolator assembly, and a flange for attaching the engine mount bracket assembly to the engine, the one piece can including an interlock arranged to engage the elastomeric bushing;
      wherein the engine mount isolator assembly is press-fit into the can and the interlock is arranged to retain the engine mount isolator assembly relative to the can, wherein the integral snubber is arranged to limit movement of the mounting member and bushing to a predetermined amount relative to the can, and wherein the bushing is arranged to isolate the mounting member from the can thereby dampening powertrain vibration and controlling powertrain movement relative to the vehicle frame component; and
   a transmission mount assembly, the transmission mount assembly including:
      a support member arranged to be attached to a vehicle frame component;
      a pair of elastomeric transmission isolators positioned relative to each other on the support member; and
      a pair of transmission mounting brackets arranged to be positioned on the isolators and attached to a transmission component;
      wherein the transmission isolators are arranged to maintain the transmission mounting brackets in spaced relation to the support member thereby dampening powertrain vibration and controlling powertrain movement relative to the vehicle.

2. The mounting system of claim 1, wherein the can includes first and second edges and a width greater than a width of the elastomeric bushing, and the bushing includes first and second exterior surfaces such that when the bushing is press-fit into the can, the can extends beyond the first and second bushing surfaces; and
   wherein the integral snubber comprises integral snubbers extending a predetermined amount from the first and second exterior surfaces of the bushing towards the first and second exterior surface of the can thereby limiting movement of the bushing relative to the can in a direction of the width of the can.

3. The mounting system of claim 1, wherein the interlock comprises a protrusion formed in an exterior surface of the can and continuous around a perimeter of the can.

4. The mounting system of claim 1, wherein the mounting member is arranged to extend beyond the first and second exterior edges of the can.

5. The mounting system of claim 1, wherein the mounting member comprises a metallic mounting member with an aperture arranged to receive a fastener.

6. The mounting system of claim 5, wherein the metallic mounting member comprises an aluminum mounting member.

7. The mounting system of claim 1, wherein the mounting member comprises:
   a shaft with an aperature arranged to receive a fastener; and
   two projections extending from the shaft in an opposite direction relative to each other and along a direction parallel to a length of the elastomeric bushing.

8. The mounting system of claim 1, wherein the support member includes an isolator support portion positioned on each end of a central connecting portion and angled relative to the central connecting portion, and wherein the elastomeric transmission isolators are positioned on the isolator support portions of the support member.

9. The mounting system of claim 8, wherein each isolator support portion is angled relative to the central portion at an angle between 20 and 27 degrees.

10. The mounting system of claim 8, wherein the isolators are positioned on the isolator support portions and spaced apart relative to each other between 220 millimeters and 240 millimeters.

11. The mounting system of claim 8, wherein the pair of transmission isolators comprises:
    a first isolator having a first isolator surface opposed to a transmission and a first isolator axis projecting normal to the first isolator surface; and
    a second isolator having a second isolator surface opposed to the transmission and a second isolator axis projecting normal to the second isolator surface;
    wherein each isolator support portion is angled relative to the central connecting portion at an angle between 20 and 27 degrees, wherein the isolators are positioned on the isolator support portions and spaced apart relative to each other between 220 millimeters and 240 millimeters, and wherein the first isolator axis and the second isolator axis intersect above a torque reaction axis of the transmission.

12. The mounting system of claim 1, wherein the pair of transmission isolators comprises:
    a first isolator having a first isolator surface opposed to a transmission and a first isolator axis projecting normal to the first isolator surface and intersecting a torque reaction axis of the transmission; and
    a second isolator having a second isolator surface opposed to the transmission and a second isolator axis projecting normal to the second isolator surface and intersecting the torque reaction axis of the transmission;

wherein the first and second isolator axes intersect the torque reaction axis at substantially a ninety degree angle to each other.

13. The mounting system of claim 1, wherein the pair of transmission isolators and the pair of transmission mounting brackets include concentric apertures arranged to receive a fastener for securing each transmission isolator and transmission mounting bracket to the support member.

14. A powertrain mounting system, the mounting system comprising:
- a pair of engine mount assemblies, each engine mount assembly including:
  - an engine mount isolator assembly having an elastomeric bushing with an encapsulated mounting member and an integral snubber; and
  - an engine mount bracket assembly having a one piece can arranged to house the isolator assembly, and a flange for attaching the engine mount bracket assembly to the engine, the one piece can including an interlock arranged to engage the elastomeric bushing;
  - wherein the engine mount isolator assembly is press-fit into the can and the interlock is arranged to retain the engine mount isolator assembly relative to the can, wherein the integral snubber is arranged to limit movement of the mounting member and bushing to a predetermined amount relative to the can, and wherein the bushing is arranged to isolate the mounting member from the can thereby dampening powertrain vibration and controlling powertrain movement relative to the vehicle frame component;
- a transmission mounting assembly including:
  - a support member arranged to be attached to a vehicle frame component;
  - a pair of elastomeric transmission isolators spaced relative to each other on the support member; and
  - a pair of transmission mounting brackets arranged to be positioned on the isolators and attached to a transmission component;
  - wherein the transmission isolators are arranged to maintain the transmission mounting brackets in spaced relation to the support member; and
- wherein the pair of transmission isolators comprises:
  - a first isolator having a first isolator surface opposed to a transmission and a first isolator axis projecting normal to the first isolator surface and intersecting a torque reaction axis of the transmission; and
  - second isolator having a second isolator surface opposed to the transmission and a second isolator axis projecting normal to the second isolator surface and intersecting the torque reaction axis of the transmission.

15. The mounting system of claim 14, wherein the can includes first and second edges and a width greater than a width of the elastomeric bushing, and the bushing includes first and second exterior surfaces such that when the bushing is press-fit into the can, the can extends beyond the first and second bushing surfaces; and
wherein the integral snubber comprises integral snubbers extending a predetermined amount from the first and second exterior surfaces of the bushing towards the first and second exterior surface of the can thereby limiting movement of the bushing relative to the can in a direction of the width of the can.

16. The mounting system of claim 15, wherein the mounting member comprises a metallic mounting member with an aperture arranged to receive a fastener, and wherein the mounting member is arranged to extend beyond the first and second exterior edges of the can.

17. The mounting system of claim 14, wherein the interlock comprises a protrusion formed in an exterior surface of the can and continuous around a perimeter of the can.

18. The mounting system of claim 14, wherein the mounting member comprises:
- a shaft with an aperature arranged to receive a fastener; and
- two projections extending from the shaft in an opposite direction relative to each other and along a direction parallel to a length of the elastomeric bushing.

19. The mounting system of claim 14, wherein the support member includes an isolator support portion positioned on each end of a central connecting portion and angled relative to the central connecting portion, wherein the elastomeric transmission isolators are positioned on the isolator support portions of the support member, and wherein each isolator support portion is angled relative to the central connecting portion at an angle between 20 and 27 degrees and the isolators are spaced apart relative to each other between 220 millimeters and 240 millimeters.

20. The mounting system of claim 14, wherein the first and second isolator axes intersect the torque reaction axis at substantially a ninety degree angle to each other.

* * * * *